US009223380B2

(12) United States Patent
Radulescu

(10) Patent No.: US 9,223,380 B2
(45) Date of Patent: Dec. 29, 2015

(54) SYSTEM AND METHOD FOR POWER SAVING MODES IN HIGH SPEED SERIAL INTERFACE COMMUNICATION SYSTEMS UTILIZING SELECTIVE BYTE SYNCHRONIZATION

(75) Inventor: Andrei Radulescu, Eindhoven (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 295 days.

(21) Appl. No.: 13/878,327

(22) PCT Filed: Oct. 19, 2011

(86) PCT No.: PCT/EP2011/068278
§ 371 (c)(1),
(2), (4) Date: Jun. 14, 2013

(87) PCT Pub. No.: WO2012/052487
PCT Pub. Date: Apr. 26, 2012

(65) Prior Publication Data
US 2013/0262892 A1 Oct. 3, 2013

Related U.S. Application Data

(60) Provisional application No. 61/394,406, filed on Oct. 19, 2010.

(51) Int. Cl.
*G06F 1/32* (2006.01)
*H04L 7/04* (2006.01)
(52) U.S. Cl.
CPC ............. *G06F 1/3234* (2013.01); *H04L 7/042* (2013.01)

(58) Field of Classification Search
CPC ............................. H04L 7/042; G06F 1/3253
See application file for complete search history.

(56) References Cited

U.S. PATENT DOCUMENTS 5,701,329 A 12/1997 Croft et al.
6,662,332 B1 * 12/2003 Kimmitt ....................... 714/762
(Continued)

FOREIGN PATENT DOCUMENTS

CN 1110886 A 10/1995
EP 1 176 753 A2 1/2002
EP 1 912 451 A2 4/2008

OTHER PUBLICATIONS

International Search Report issued in corresponding International application No. PCT/EP2011/068278, mailing date Feb. 7, 2012.
(Continued)

*Primary Examiner* — Albert Wang
(74) *Attorney, Agent, or Firm* — Patent Portfolio Builders PLLC

(57) ABSTRACT

A system and method for minimizing power consumption in a transceiver circuit that uses a digital high-speed serial communications link between at least two devices is presented. Comma code matching is generally used as a means for establishing byte synchronization and for determining and preventing data transfer errors. However, comma code matching, when performed in high speed serial communications links that can transfer data at rate of giga-bits per second, can use a significant amount of power. Thus, the system and method described herein maintain comma code matching in an off-state, and transition comma code matching from an off-state to an on-state when a substantive operational change occurs in the serial communications link.

21 Claims, 7 Drawing Sheets

(56) References Cited

U.S. PATENT DOCUMENTS

| | | |
|---|---|---|
| 2003/0093607 A1 | 5/2003 | Main et al. |
| 2004/0103333 A1* | 5/2004 | Martwick et al. ............ 713/400 |
| 2006/0050827 A1* | 3/2006 | Saeki et al. .................. 375/362 |
| 2007/0234080 A1* | 10/2007 | Mackey et al. .............. 713/300 |
| 2008/0195912 A1 | 8/2008 | Mende et al. |
| 2010/0250805 A1* | 9/2010 | Cohen et al. ................. 710/110 |

OTHER PUBLICATIONS

DRAFT MIPI Alliance Specification for Unified Protocol (UniProSM), draft version 1.10.00 Revision 0.11, Jul. 29, 2009.

DRAFT MIPI Alliance Specification for M-PHY, draft version 0.71.00 Revision 0.01, Sep. 11, 2009.

Search Report in corresponding Chinese Application No. 20118006213X dated Feb. 10, 2015.

\* cited by examiner

SYSTEM AND METHOD FOR POWER SAVING MODES IN HIGH SPEED SERIAL INTERFACE COMMUNICATION SYSTEMS UTILIZING SELECTIVE BYTE SYNCHRONIZATION

TECHNICAL FIELD

The present invention relates generally to digital circuits and more specifically to systems and methods for saving power in high speed serial interface circuits.

BACKGROUND

Electronic devices, such as mobile phones, personal computers, personal digital assistants, and many others, utilize processors, memories, input/output (I/O) and other digital devices in order to provide their designed functionality to end users. These various digital devices are connected to one another using interconnects (also sometimes referred to as "busses" or "interfaces"), which convey data, signals and commands between or among the various devices.

With the advance in complementary metal oxide semiconductor (CMOS) technology, there is a tendency to move from parallel to high-speed serial interfaces. The reasons for this are twofold. First, there is less physical package room on chips for many pins. Over time, integrated circuit devices, or "chips" have tended to shrink and/or provide more functionality (and hence more interfaces). As a result, fewer pins must be used to convey the same or an increased amount of data. Second, while the data volume increases, packaging size has either stayed the same and/or decreased, meaning that power consumption must also decrease (unless made from different materials, power consumption and heat dissipation are phenomena proscribed by the material used to make the chip, presuming heat dissipation methods are maximized, within reason). As a result, the use of serial interfaces has increased which are faster and consume less power.

In a protocol stack of a serial interface (a protocol stack is a system describing how information is transferred between devices on physical interconnects), there are a number of layers, including the physical, or "PHY" layer. An example of such a PHY layer and associated protocol are M-PHY and unified protocol (UniPro), respectively, both standardized in the Mobile Industry Processor Interface (MIPI) Alliance. Within the serial PHY technology, encoded (e.g., 8b/10b coding) PHYs are typically preferred. Most of the current high-speed serial interfaces, including MIPI/M-PHY, PCI Express, SuperSpeed USB, HyperTransport, RapidIO, InfiniBand and Serial ATA use an encoded PHY layer. Encoded PHY layers are used because they provide more robust communication, provide enough state changes to allow clock recovery, and are useful for detecting byte boundaries (sometimes called byte synchronization) of data during a transmission on the interconnect.

Byte synchronization can be achieved by, for example, the transmitter (Tx) inserting comma codes, which are unique bit patterns in any valid bit stream. Comma codes have several unique features. A first feature is that it is a unique bit pattern that cannot be encountered by any other combination of bit symbols in normal transmission. Secondly, if all of the bits of the comma code are inversed, the uniqueness of the pattern remains The receiver (Rx) can then search for such a comma code in data received over the interconnect and, when a comma code is found, the Rx establishes byte sync, which can be used for further communication with normal PHY symbols which are not unique within a bit stream. The process of searching for and finding comma codes is commonly referred to as "comma code matching."

There are certain problems, however, with using comma code matching techniques for byte synchronization in interconnects. One such problem is that constantly searching for comma codes uses a significant amount of power. These and other problems are discussed in greater detail below. Accordingly, it would be desirable to provide methods, modes and systems for byte synchronization that minimizes use of comma codes, for use, by way of example, in M-PHY links in UniPro systems.

SUMMARY

It is therefore a general aspect of the invention to provide a transceiver that will obviate or minimize problems of the type previously described.

According to a first aspect of the present invention, a transceiver is provided comprising a method for minimizing power consumption in a circuit that uses a digital high-speed serial communications link between two devices comprising maintaining comma code matching in an off-state for a period of time, and transitioning comma code matching from an off-state to an on-state when an operational change occurs in the serial communications link.

According to the first aspect of the present invention, the operational change includes at least one of (a) link start-up of communications using the serial communications link, (b) reconfiguration of the serial communications link, and (c) error recovery from an error in the serial communications link, and further wherein the operational change is a link startup and includes at least one of a boot start-up of at least one of the two devices, and a re-boot condition of at least one of the two devices.

Still further according to the first aspect, the operational change is a reconfiguration and includes reconfiguring the serial communications link in terms of at least one of power and communication speed. The method according to the first aspect further comprises performing byte synchronization in the serial communications link between the two devices, and wherein performing byte synchronization includes transmitting a first physical layer symbol of marker 0 that is a comma code symbol followed by a second physical layer symbol marker 1 that can be at least one of a non-comma K-code symbol, a comma K-code symbol, and a data code symbol.

According to the first aspect, the method further comprises transitioning comma code matching from an on-state to an off-state following reception of a byte synchronization pattern from the serial communications link such that bit and/or byte synchronization is regained, and determining that a burst error has occurred to cause the operational change in the serial communications link, wherein the burst error includes a certain number of PHY symbol transmission errors, and transitioning comma code matching from the on-state to the off-state following the reception of a byte synchronization pattern from the serial communications link such that bit and/or byte synchronization is regained. According to the first aspect, the PHY symbol transmission error includes at least one of a bad PHY symbol being received, a correct exception PHY symbol being received but not being mapped to a valid UniPro symbol, a correct exception PHY symbol being received immediately after another exception PHY symbol when a data PHY symbol was expected, and an incorrect value of a valid data PHY symbol being received following an ESC_PA.

According to the first aspect, the method further comprises determining that the operational change includes an acknowledgment flow control (AFC) frame and/or a negative acknowledgment control (NAC) frame not being received within a duration of a timer as a result of a loss of bit and/or byte synchronization. The method according to the first aspect still further comprises transitioning comma code matching from the on-state to the off-state following the reception of the byte synchronization pattern from the serial communications link, and regaining bit and/or byte synchronization in the serial communications link.

According to a second aspect of the present invention, a digital high-speed serial communications transceiver (500) for conducting communications between two devices via a serial communications link is provided comprising an error manager (426) configured to capture error indications in received data and control frames, and for issuing a negative acknowledgment control (NAC) frame request, an NAC framer (428) configured to transmit the NAC frame in response to a NAC request, and to initiate the transmission of a byte-sync control signal in response to the received NAC frame, at least one receiver (404), wherein the at least one receiver (404) includes a byte sync sub-block (406) configured to perform comma code matching on received signals from the other device and a byte-sync control sub-block (502) configured to transition the byte sync sub-block (406) between an off-state and an on-state for a period of time, and wherein the byte sync sub-block (406) is further configured to perform comma code matching when a change in operation of the serial communications link occurs.

According to the second aspect of the present invention, the operational change includes at least one of (a) link start-up of communications using the serial communications link, (b) reconfiguration of the serial communications link, and (c) error recovery from an error in the serial communications link. Still further according to the second aspect, the operational change is link startup and includes at least one of a boot start-up of at least one of the two devices, and a re-boot condition of at least one of the two devices.

According to the second aspect, the operational change is reconfiguration and includes reconfiguring the serial communications link in terms of at least one of power and communication speed, and further wherein byte synchronization in the serial communications link occurs between the two devices. Byte synchronization includes transmitting a first physical layer symbol marker 0 that is a comma code symbol followed by a second physical layer symbol marker 1 that can be at least one of a non-comma K-code symbol, a comma K-code symbol, and a data code symbol.

According to the second aspect, the byte-sync control sub-block (502) is configured to transition the byte sync block (406) from an on-state to an off-state following reception of a byte synchronization pattern from the serial communications link such that bit and/or byte synchronization is regained, and wherein circuitry (422, 426, 428) is configured to determine that a burst error has occurred to cause the change in operation of the serial communications link, wherein the burst error includes a certain number of PHY symbol transmission errors, and byte sync sub-block (406) is further configured to transition comma code matching from the on-state to the off-state following reception of a byte synchronization pattern from the serial communications link such that bit and/or byte synchronization is regained.

According to the second aspect of the present invention, the PHY symbol transmission error includes at least one of a bad PHY symbol being received, a correct exception PHY symbol being received but not being mapped to a valid UniPro symbol, a correct exception PHY symbol being received immediately after another exception PHY symbol when a data PHY symbol was expected, and an incorrect value of a valid data PHY symbol being received following an ESC_PA.

Still further according to the second aspect of the present invention, the transceiver includes circuitry (422, 426, 428) that is further configured to determine that the operational change includes an acknowledgment flow control (AFC) frame and/or a negative acknowledgment control (NAC) frame not being received within a duration of a timer as a result of a loss of bit and/or byte synchronization and wherein the byte sync sub-block (406) is further configured to transition comma code matching from the on-state to the off-state following reception of the byte synchronization pattern from the serial communications link. Still further according to the second embodiment, the transceiver (500) regains bit/byte synchronization in the serial communications link.

According to a third aspect of the present invention, a computer readable medium of instructions is provided for minimizing power consumption in a circuit that uses a digital high-speed serial communications link between two devices, wherein the computer readable medium comprises a first set of instructions adapted to maintain comma code matching in an off-state for a period of time and a second set of instruction adapted to transition comma code matching from an off-state to an on-state when an operational change occurs in the serial communications link, and wherein the computer readable medium is non-transitory.

BRIEF DESCRIPTION OF THE DRAWINGS

The above and other objects and features of the present invention will become apparent and more readily appreciated from the following description of the embodiments with reference to the following figures, wherein like reference numerals refer to like parts throughout the various figures unless otherwise specified, and wherein:

FIG. 1 is a high level block diagram depicting two devices which communicate via an interconnect and which can use link startup protocols according to these exemplary embodiments to establish a communication link there between;

DETAILED DESCRIPTION

Figure 1:
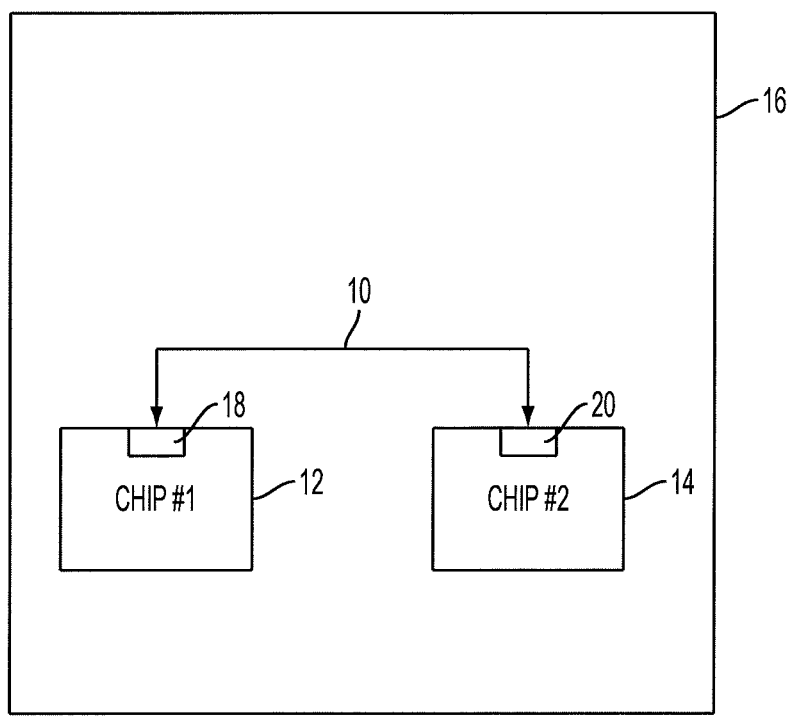

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout. Instead, the scope of the invention is defined by the appended claims.

Exemplary embodiments described herein relate to byte synchronization techniques associated with interconnects or interfaces. As mentioned above, conventional comma coding byte synchronization techniques suffer from certain drawbacks. In particular, one problem with comma code matching is that it is a power hungry process as it performs bit pattern matching at multi-Giga bits per second (Gbps) rates. As a result, it would be beneficial to have the ability to turn the comma code matching off when it is not needed. According to exemplary embodiments, methods, devices, systems and software are described for turning on comma code matching when the likelihood of byte synchronization errors is high. This can be achieved by, for example, turning on the comma code matching functionality only during certain communication periods, such as re-boot, reconfiguration, and when recovering from an error, among others, when there is or has been demonstrated to be a higher likelihood that comma code matching is needed than during other communication periods. Exemplary embodiments thus provide for lower power consumption, while at the same time preserving link robustness at a high level.

In order to provide some context for discussion of the exemplary embodiments, some information is first provided about UniPro protocols and systems in which these exemplary embodiments can be used. However, it will be understood by those skilled in the art that the exemplary embodiments described herein include, but are not limited to, usage in UniPro standardized systems. For example, it is well known that in many high-speed interfaces (i.e., those in which data transfer rates in the order of Gbps occur), there is no separate clock—the clock is embedded in the data signal, and the receiver must receive the signal, and attempt to track the received signal in order to correctly obtain the data in the signal. However, the nominal frequency of the transmitted signal is known, and the receiver can use well known clock recovery techniques to match the receive frequency with the transmit frequency, which can differ in phase and/or frequency by a certain amount. One such method is based on monitoring closely transitions from and between different voltage levels. The "transition monitoring" technique uses edge detectors and can, under some scenarios, include oversampling to determine the transitions and find the correct positions for the data. While such systems do use a lot of power, they are able to find the clock and lock the receiver onto the data signal in a relatively short amount of time. Thus, other examples of current or future implementations in which the exemplary embodiments can or may be useful include those that utilize such oversampling techniques for data acquisition. Furthermore, other types of commercially available interface systems in which the exemplary embodiments can or may be useful include a Low Latency Interface (LLI), which is also an MIPI standard, and the Super Speed Inter-Chip interface (SSIC) which is a USB-3 protocol that can be used with M-PHY.

As generally shown in FIG. 1, a UniPro interconnect (or bus or interface) 10 can, for example, be used to connect groups, (e.g., pairs or other multiples up to 128) of devices (e.g., chips 12 and 14) within composite device or system 16, such as a mobile phone. The devices or chips 12 and 14 can include various sorts of chips which transfer data over an interconnect, e.g., baseband chips, application processors, graphics chips, flash storage chips, etc. Data packets that are conveyed over the interconnect or link 10 from, e.g., chip 12 to chip 14, can subsequently be routed to other destination chips or modules within the composite device 16 using a UniPro switch (not shown in FIG. 1). Chips 12 and 14 can, in this exemplary embodiment, each include a UniPro+M-PHY interface 18 and 20 (the interface 18, 20 can also be referred to as a "UniPort-M" interface 18, 20), and interconnect 10 can be implemented using a bidirectional dual simplex link, i.e., a link having one or more unidirectional PHY lanes in both directions. UniPort-M interfaces 18 and 20 allow up to four lanes per direction, with each lane in a single direction having the same power and speed capabilities; however, the two directions of the link can also have different capabilities. In this context, a "lane" can be considered to be a point-to-point, serial link operating in one transmit direction.

Among other things, UniPort-M interfaces 18 and 20 differ from existing interconnect interfaces with respect to, among other things, the flexibility that they permit in creating and configuring a link 10. For example, UniPort-M interfaces 18 and 20 support asymmetrical links, as opposed to other types of interfaces, such as PCI Express, RapidIO and HyperTransport, all of which require the two directions of the link to be fully symmetrical (i.e., both directions of the link have the same number of lanes). UniPort-M interfaces 18 and 20 can also allow only some of their lanes to be connected, and there are no restrictions on how the lanes are connected, since the lanes are renumbered during the link start-up as will be described below. In this context, the term "connected," as it refers to lanes, means physically connected. For example, suppose that chip 12 is a chip that offers a UniPort-M interface 18 with four lanes, but is used in system 16 in which chip 12 is attached to chip 14 that has more limited connectivity, e.g., having only two receive lanes. As a result, two of the lanes available for chip 12 are intentionally left physically unconnected. Lanes may also be accidentally unconnected due to physical errors between chips (e.g., circuit runs "open up" in the circuit board or flex foil). UniPort-M interfaces 18 and 20 also support asymmetrically configured links (e.g., the two directions of the links can be set in different power modes), as opposed to other interfaces, such as, for example, PCI Express, RapidIO and HyperTransport, all of which require the two directions of the link to be in the same power mode.

Figure 2:
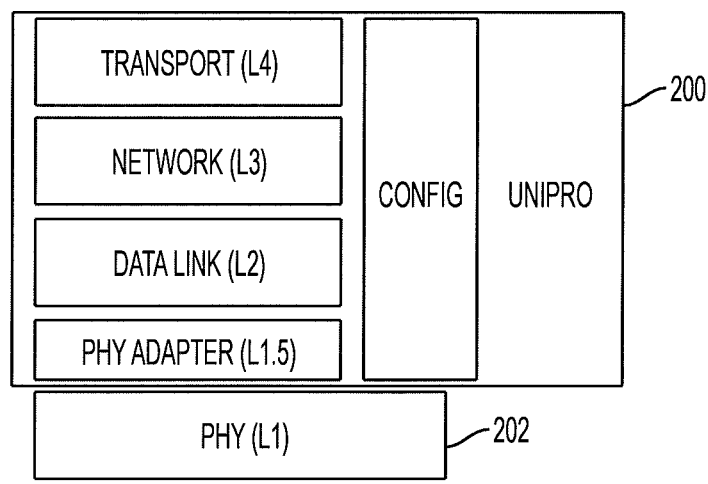
FIG. 2 shows a stack protocol and physical layer associated with an interconnect according to an exemplary embodiment.

In FIG. 2, UniPro protocol stack 200 and PHY layer 202 are depicted. PHY layer 202 is the mixed signal, analog design that ensures the transfer of bits at a high speed (Gbps)-per-lane range). Examples of PHY layers include the M-PHY and D-PHY, which are standardized in the MIPI Alliance. The UniPro protocol is an example of a protocol that is typically implemented in digital logic (but parts could be implemented in software as well) due to the supported high data rates. UniPro protocol functionality includes data packetization, detecting and correcting PHY transmission errors, flow control, data prioritization, and configuration.

The link-level error handling scheme of the UniPro protocol is based on error detection and data frame retransmission, and consists of two safety nets. The first safety net is fast and handles typical errors. The second safety net is slower and handles "corner cases" (i.e., those scenarios that usually manifest themselves more rarely due to combination of factors that may need to be present for the failures to occur). The first UniPro protocol safety net adds a Cyclic Redundancy Check (CRC) error detection code to each transmitted frame. The receiver re-computes the CRC and verifies it against the CRC received at the end of the frame. When the received frame is correct, the receiver commits it to the receive buffer and acknowledges the frame to the transmitter (for a data frame), or processes it (for a control frame). In case the receiver detects an error, it reports that error back to the transmitter using a Negative Acknowledgement Control (NAC) frame.

In UniPro specified systems, all transmitted data frames are assigned a sequence number, which is also transmitted in the data frame, and is used by the receiver for acknowledgment. Normally the UniPro sequence number has 5 bits though the number of bits can be adjusted as needed. The reset value is 0, and is used for the first data frame transmission. The sequence number is incremented with every frame transmitted/received and wraps around at 31 (with five bits used for the sequence number). In UniPro, at most 16 frames can be transmitted without receiving an acknowledgment. Frame acknowledgment is performed using Acknowledgement Flow Control (AFC) control frames. When acknowledging frames, the sequence number in the AFC frame acknowledges all unacknowledged data frames up to and including the one identified by the sequence number.

The transmitter saves all transmitted data frames in a retransmission buffer until acknowledged. When a NAC control frame is received (reporting an error), all data frames in the retransmission buffer are retransmitted starting with the oldest unacknowledged frame.

The second UniPro safety net is used for the cases in which one or more of the AFC or NAC frames are lost. In such cases, either the acknowledgments and/or link-level flow control credits contained in an AFC frame are lost, or an error indication contained in an NAC frame is lost. To protect against such errors, which typically are rare, two timers are used for each traffic class: one for data, called a replay timer, and one for credits, called a credit timer. When the replay timer expires, all the unacknowledged frames in that traffic class are retransmitted. When the credit timer expires, an AFC frame with the CReq bit set is sent for that traffic class. In both cases, (i.e., the loss of either the "AFC" frame or the "NAC" frame), UniPro 1.10.00 requires the link to be resynchronized, after which an NAC frame with the RReq bit is sent to also require the incoming link to be resynchronized.

In addition to the CRC errors, as part of the first safety net, the receiver detects numerous other errors, for example: receiver buffer overflow (e.g., due to a bit transmission error in the TCx field); incoming data frame length larger than the maximum frame size DL MTU (e.g., due to a transmission error changing the EOF control symbol into a valid data symbol); incorrect sequence number in a data frame; an AFC frame not followed by two data symbols; an NAC frame not followed by one data symbol; an EOF/EOF_PAD not followed by one data symbol; reception of a COF, EOF or EOF_PAD control symbol when no data frame has been started; reception of an SOF symbol when a data frame of the same traffic class is already ongoing and the data frame is not currently pre-empted (during a pre-emption by AFC and/or NAC, SOF reception may indicate the start of a re-transmission, and, therefore, is not considered an error); reception of an SOF symbol for traffic class 0 (TC0) when a traffic class 1 (TC1) data frame is already ongoing (TC0 cannot pre-empt TC1); reception of a COF symbol during a data frame of the same traffic class, when that data frame has not been pre-empted; reception of a COF symbol continuing a data frame of a different traffic class (TC); reception of an EOF, EOF_PAD or a data symbol when a data frame is pre-empted and the pre-empting frame has finished (for a pre-empted frame, a COF symbol, not an EOF symbol should follow); reception of a control symbol with invalid values for defined fields, e.g. undefined CTRL_ID or TC; and reception of an error indication from the PHY Adapter.

The PHY Adapter indicates an error in the following cases: a bad PHY symbol was received; a correct exception PHY symbol was received, but it is not mapped to a valid UniPro symbol; a correct exception PHY symbol was received immediately after another exception PHY symbol, when a data PHY symbol was expected; and an incorrect value of a valid data PHY symbol is received following an ESC_PA.

When any of the above errors is detected, a NAC control frame is transmitted, and in addition, is possibly preceded by a pair of AFC control frames to prevent unnecessary retransmissions.

Figure 3:
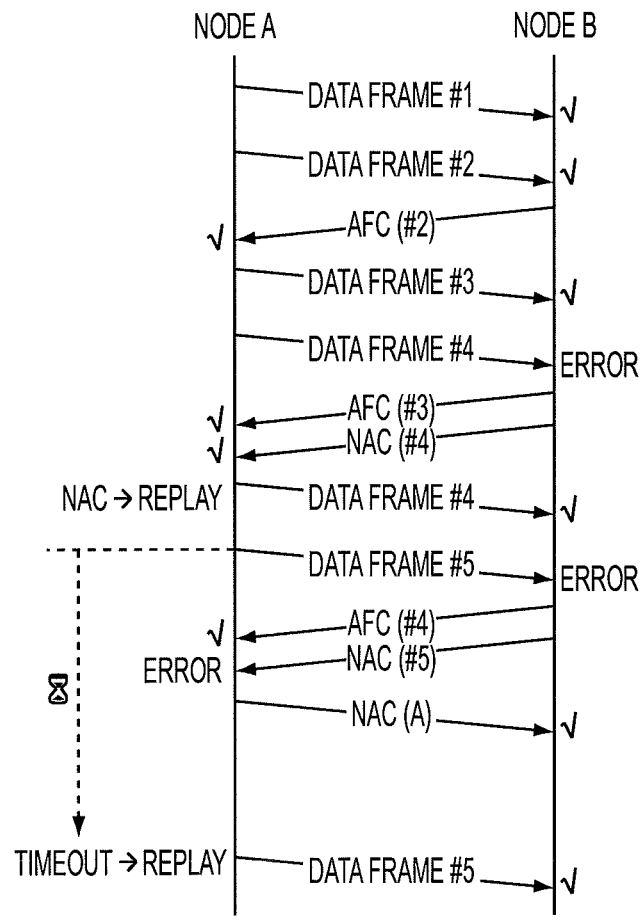
FIG. 3 illustrates error signaling and recovery in an exemplary UniPro system.

FIG. 3 illustrates error signaling in an exemplary UniPro system. In FIG. 3, an exemplary message sequence chart is shown to illustrate the first and second safety nets of the UniPro error handling mechanism that were described above. For simplicity reasons, a single traffic class is assumed. Implementation of the first safety net is discussed first. Therein, after correctly receiving data frames #1 and #2, Node B (e.g., device 14) reports their correctness by sending to Node A (e.g., device 12) an AFC frame carrying the sequence number of the last correctly received frame, data frame #2 in this case. When Node A receives AFC #2 frame, it removes all the frames up to data frame #2 from the retransmission buffer. Node A continues sending data frames #3 and #4; however, only data frame #3 is correctly received in this example, because of an error occurring in the transmission of data frame #4. This error is detected at Node B, which first sends to Node A AFC frame #3 to acknowledge the correct receipt of data frame #3, followed by an NAC frame reporting the error. Upon receipt of the NAC frame, Node A retransmits all of the unacknowledged frames starting with the oldest, in this case data frame #4. Thus, as described above, the first safety net is implemented when an error occurs in receipt of a data frame, and an NAC frame is sent upon determination of the error. Upon successful receipt of the NAC frame, the data frame with the error is retransmitted.

Discussion will now be made in regard to the second safety net. Following receipt of the first NAC frame from Node B, Node A follows up the retransmitted data frame #4 with a transmission of data frame #5. Data frame #4 is correctly received, but an error is detected for data frame #5 by Node B. Consequently, as in the previous case, AFC frame #4 is sent to report the correct receipt of data frame #4, and then an NAC frame is sent to report the error. However, in this case, the NAC frame encounters a transmission error. Node A recognizes that an error had to occur by detecting an error in the received NAC's CRC. Node A then reports the error by transmitting in receipt of the NAC frame from the receiver by transmitting its own NAC frame (A); however, Node A does not immediately recognize that it should retransmit data frame #5. Eventually, Node A's replay timer expires (as shown by the hourglass in FIG. 3), and Node A retransmits data frame #5. Thus, an illustration has been made of an implementation of the second safety net discussed above in regard to UniPro interface systems.

As discussed above, the two safety nets provide important functions (or "protocol actions") in UniPro high speed serial interface communications systems. The first safety net handle the "typical" errors of missing/lost and/or corrupted data; these are usually referred to as "light" error conditions. According to an exemplary embodiment, the implementation or use of the first safety net would not ordinarily require the use of comma code matching. The second safety net, alternatively, handles the atypical, more consequently type errors (referred to as "heavy" error conditions). "Heavy" error conditions may involve bit and/or byte synchronization loss. Thus, when a second error conditions occurs, systems and methods according to an exemplary embodiment would use comma code matching in order to recover from the loss of synchronization to the greatest extent possible.

Figure 4:
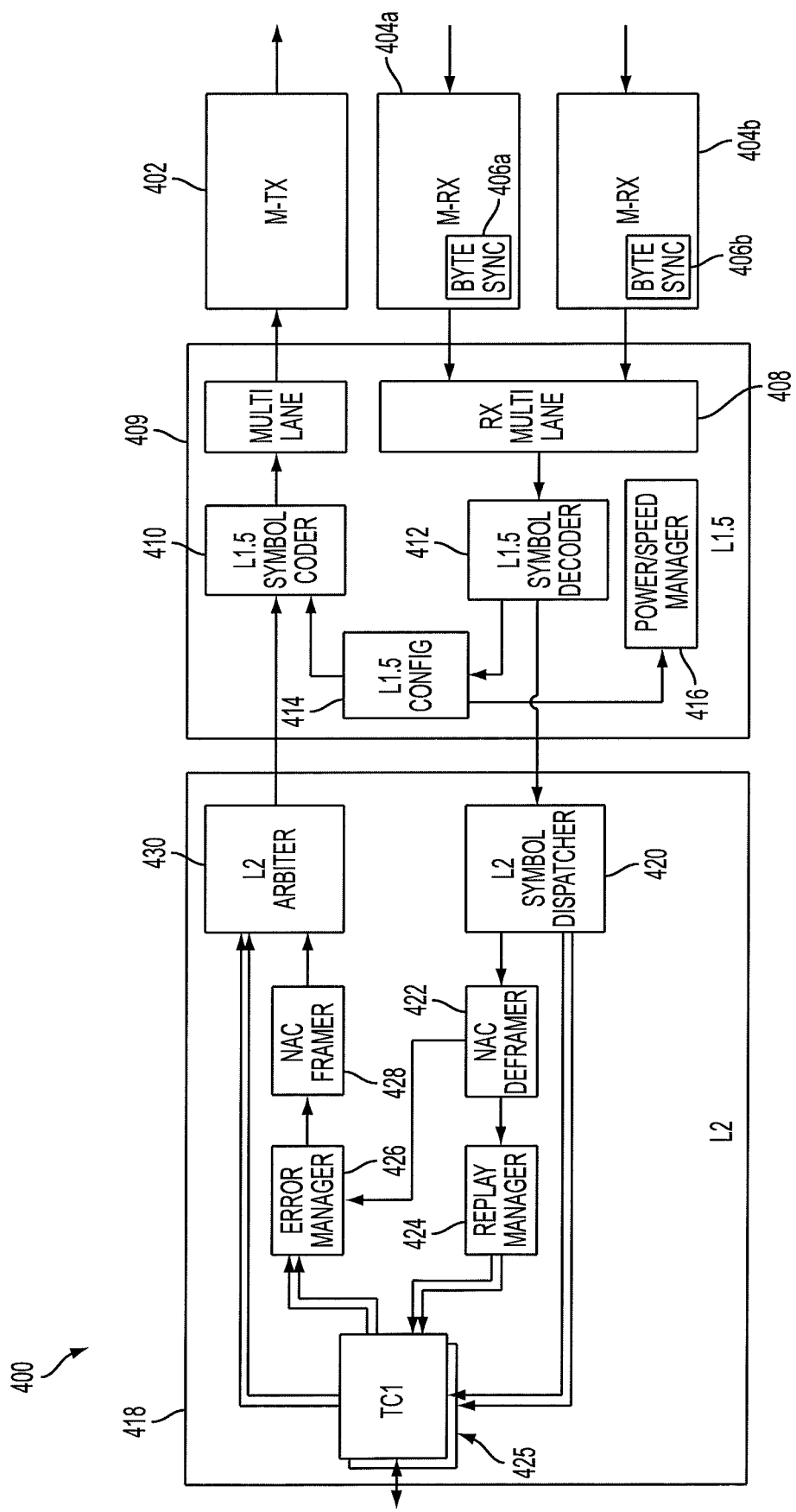
FIG. 4 shows an exemplary L1.5/L2 architecture associated with a UniPro device.

With this context in mind, a discussion of byte synchronization associated with such data flows according to exemplary embodiments will now be presented. FIG. 4 depicts an exemplary, simplified UniPro L1.5/L2 transceiver architecture (transceiver) 400. Transceiver 400 includes UniPro L1.5 architecture (L1.5 sub-assembly) 409 and UniPro L2 architecture (L2 sub-assembly) 418. Transceiver 400 supports a 1-lane PHY transmitter 402 (as indicated by the single arrow emanating from transmitter block 402) and a 2-lane PHY receiver comprised of two M-RX receiver (PHY receiver) 404a and 404b. The PHY receivers 404a,b are shown as each including a byte sync sub-block 406 that scans for comma codes to achieve byte synchronization. This block is always turned on while transmitting encoded symbols.

If multiple lanes exist in transceiver 400, symbol stripping is handled by Rx multi-lane sub-block 408, located in L1.5 sub-assembly 409. L1.5 sub-assembly 409 further comprises an L1.5 symbol encoder 410 and L1.5 symbol decoder 412 to map the UniPro symbols to PHY symbols, an L1.5 Configuration block (configuration sub-block) 414 to handle the PHY configuration, and power/speed manager 416 to handle distribution of power.

According to an exemplary embodiment, L2 sub-assembly 418 includes L2 symbol dispatcher 420 to distribute the incoming symbols to their corresponding de-framers. One of these is the NAC de-framer 422, which decodes NAC frames. The other de-framers (for AFC and data frames, which are not shown) are contained in the traffic class 0 (TC0) and traffic class 1 (TC1) sub-blocks (TC sub-blocks) 425, which take care of the traffic-class (TC) specific actions. As those of ordinary skill in the art can appreciate, the TC blocks of FIGS. 4 and 5 contain one or more data buffers. The Tx buffer is used to store data until it is acknowledged by the remote Rx. Once a frame is acknowledged, its corresponding data is removed from the Tx buffer. In case of retransmission, the data is retrieved from the Tx buffer. The Rx buffer is used for flow control. The Tx buffer tracks the buffer space at the remote Rx by means of "credits" wherein each credit corresponds to 32 bytes of data. When the Tx buffer transmits data, Rx credits are "consumed," (i.e., decremented). If the Tx buffer runs out of credits, it can no longer transmit data; when the remote Rx frees up space, it sends new credits to the Tx buffer, which then enables it to send more data. As such, TC blocks are responsible for data buffering, data and AFC frame packetization/de-packetization including CRC computation, frames acknowledgement, and retransmission, credit management, and consuming/delivering data to L3. In the case of a correctly received NAC frame, NAC de-framer 422 triggers replay manager 424, otherwise, in the case of an incorrectly received NAC frame, NAC de-framer 422 notifies error manager 426. Error manager 426 also captures any error indication that may be triggered by TC sub-blocks 425, or errors that might be triggered by L1.5 sub-assembly 409, which is not shown for the dual purposes of clarity and brevity. L1.5 sub-assembly 409 further includes NAC framer 428, and L2 arbiter 430.

If an error has been detected and reported to error manager 426, error manager 426 triggers a NAC frame transmission via NAC framer 428. L2 arbiter 430 arbitrates between the NAC frame transmission requests issued by NAC framer 428, and the various frame transmission requests issued by the TC sub-blocks 425.

As discussed above, conventional comma coding byte synchronization techniques suffer from certain drawbacks, including especially performing bit pattern matching at multi-Gbps rates, wherein such bit pattern matching uses a significant amount of power. Byte sync blocks 406a, b, shown in FIG. 4, perform the comma code matching in PHY receivers 404a, b. According to an exemplary embodiment, optimization of the power consumption by byte sync blocks 406a, b can be realized by performing comma code matching at certain times, for example, only when there is a substantive change in operation of the serial communications link (i.e., an operational change). For example, a substantive change in operation can include operations of the link during link startup (i.e., during a boot start-up, or re-boot condition), reconfiguration (i.e., when the links are reconfigured in terms of speed and/or power consumption), and error recovery (i.e., between the time a NAC frame is generated until a re-transmission is detected).

In addition, optimization of power consumption by byte sync blocks 404a, b can further be realized by performing comma code matching during certain periods of time. To assist in understanding the conditions as to when comma code matching is or is not performed, two error conditions are defined.

The first error condition is defined as when a first safety net error occurs, but does not include burst errors. According to a first exemplary embodiment, a burst error can be defined as a certain number of errors in the transmission of PHY symbols (e.g., five PHY symbols have been incorrectly received). According to another exemplary embodiment, a burst error can be defined as a certain number of sequential errors in the transmission of PHY symbols. According to still a further exemplary embodiment, a burst error can be defined as a certain number of errors in received PHY symbols following a first symbol error, regardless of correctly received PY symbols following the first PHY symbol error. Thus, comma code matching is maintained in an "off" state during a first error condition, unless the errors are caused by burst errors. In that latter case, comma code matching is turned on. The second error condition is defined as when second safety net errors occur. In this case, there are no exceptions, and comma code matching is turned on until the conditions that caused the second error condition (i.e., second safety net) have ceased to exist or have been corrected.

As discussed above, a burst of PHY symbol transmission errors can cause a loss of byte synchronization. Recovering from a byte-synchronization loss requires comma code matching. As a result, the system and method according to the exemplary embodiments will automatically turn on the comma code matching when the burst errors occur. While this does increase the overall average use of power, it is still significantly less than what would have been expended if comma code matching had been turned on all of the time. Thus, judicious use of comma code matching manages power consumption to more acceptable and economical levels and reduces average power consumption, which increase the usage time of battery-powered devices, and can possible reduce actual monetary costs.

According to a further exemplary embodiment, if the M-RX 404a,b uses an over-sampled architecture to recover the clock, comma code matching can also be turned on during periods of over-sampling, and this can be an exclusive condition (meaning comma code matching is performed only when over-sampling occurs), or it can be combined with some, any, or all of the other conditions discussed above (e.g., turn comma code matching when over-sampling occurs and when there is data being transferred, or turn comma code matching when over-sampling occurs and there is a historically significant period of errors occurring).

Figure 5:
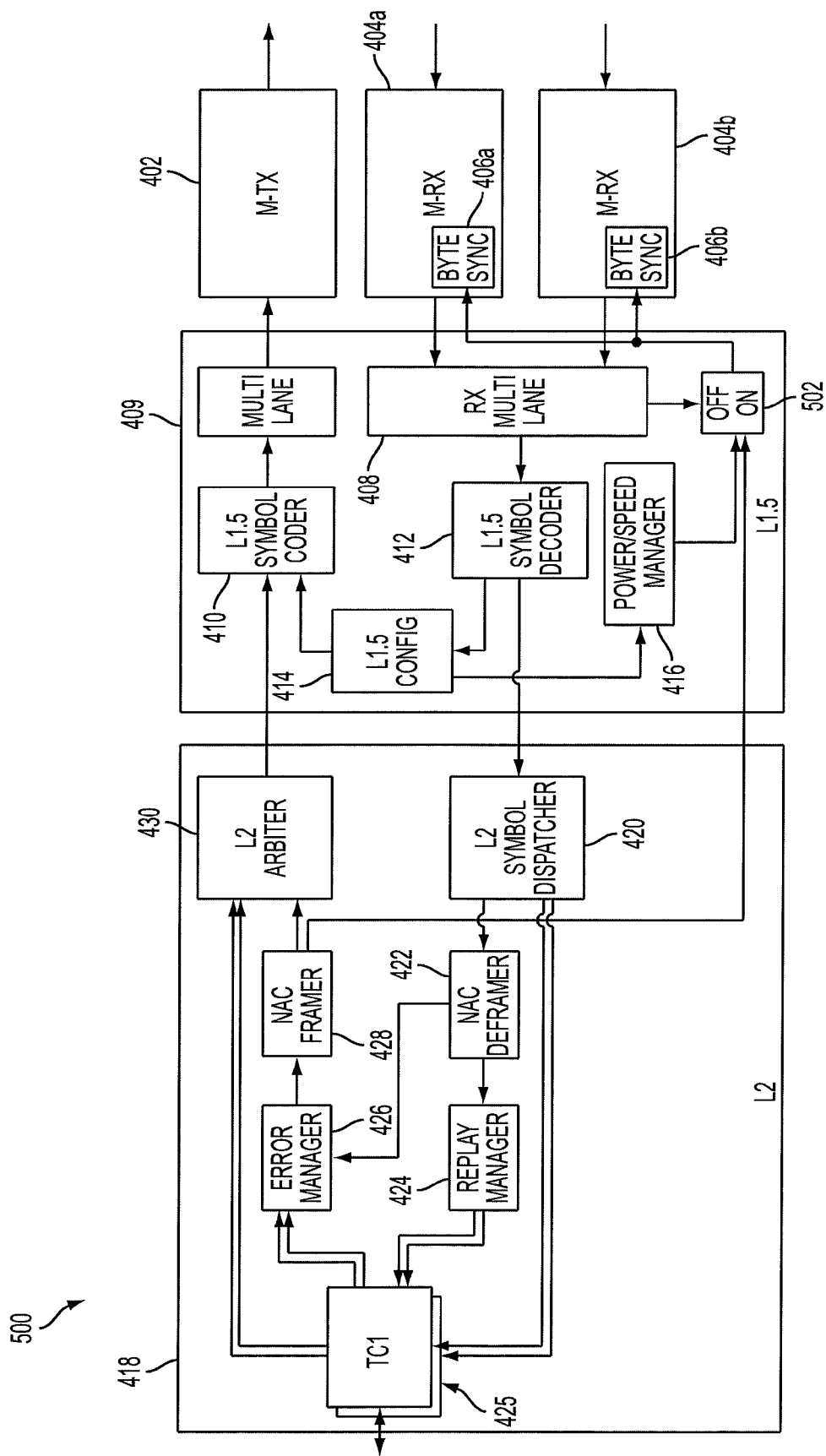
FIG. 5 shows an exemplary L1.5/L2 architecture associated with a UniPro device according to an exemplary embodiment.

Attention is now directed towards FIG. 5. FIG. 5 illustrates an exemplary transceiver 500 comprised of L1.5/L2 architecture associated with a UniPro device according to an exemplary embodiment. Elements shown in FIG. 5 have the same reference numerals as used above with respect to FIG. 4 that perform the same or similar functions to those described previously.

As discussed above, there are three typical scenarios wherein comma code matching would be advantageously employed according to exemplary embodiments of the invention. One of these is when loss of synchronization has occurred, and a NAC frame needs to be transmitted (as shown in FIG. 3, when the NAC frame from Node B was not correctly received, and Node A transmitted the NAC frame during the "time-out" period). As seen in FIG. 5, transceiver 500 has an added byte sync control sub-block 502 that controls the byte sync sub-blocks 406a, b in the PHY receivers 404a, b. According to an exemplary embodiment, byte sync sub-block 406 can be turned "on" for all active Rx lanes when error manager 426 requests an NAC frame and/or the NAC frame is granted transmission by L2 arbiter 430, and is sending the NAC frame. From that moment on, a retransmission is expected (because error manager 426 recognized the error, and issued a request to transmit the NAC frame).

Accordingly, retransmission is started (in UniPro/M-PHY) with a byte-synchronization sequence transmitted on all lanes. In an exemplary embodiment, this sequence consists of two escape PHY symbols: Marker 0 (K.28.5), which also has comma properties, and is used by the physical receiver to achieve byte synchronization, followed by a Marker 1 (K.28.3), which is a regular PHY escape symbol. According to an exemplary embodiment, the Marker 0 symbol can be a comma code symbol, and the Marker 1 symbol can be at least one of a non-comma K-code symbol, a comma K-code symbol, and a data code symbol. According to an exemplary embodiment, prior to the Marker 0 and Marker 1 symbols being transmitted, byte synchronization sub-blocks 406a, b are turned on (through byte-synchronization control sub-block 502) so that comma code matching can occur. Byte synchronization sub-blocks 406a, b are turned on, as discussed above, when error manager 426 requests an NAC frame and L2 arbiter 430 grants permission, and transmits an appropriate signal to byte-synchronization control sub-block 502 which then turns on byte synchronization sub-blocks 406a, b. According to further exemplary embodiments, when byte synchronization is again observed on all lanes, byte synchronization sub-blocks 406a, b are turned off again.

The other two significant times for performing comma code matching with byte synchronization sub-blocks 406a, b include link start-up, and link configuration. In both cases, PHY receivers 404 are reconfigured through power/speed manager 416. Thus, power/speed manager 416 also sends an appropriate signal to turn on comma code matching. When reconfiguring the active Rx lanes, power/speed manager 416 also notifies byte-synchronization control sub-block 502, which turns on byte synchronization sub-block 406 for all active lanes. After the link configuration is effectuated, the link goes through the "prepare" and possibly the "bit synchronization" phases, after which it transmits the byte-synchronization sequence. According to exemplary embodiments, the byte synchronization sub-block 406 is turned off when the receiver receives Marker 0 on all M-RX 404a, b.

Exemplary embodiments thus optimize the power consumption of the transceiver 500 by using comma code matching for byte synchronization by turning on byte synch sub-block 406 only when it is required. Such times include when there are operational changes in the link, when errors are detected during data transmissions, and those times, when the link is initialized or reinitialized, during which byte synchronization is also acquired (e.g., during link startup, reconfiguration, and/or when recovering from an actual error). Even though utilization of the exemplary embodiments may cause transceiver 500 to miss regaining byte sync during rare transmission error cases from time-to-time, those of skill in the art can appreciate that regaining immediate byte sync in those cases is less useful, as some data was corrupted anyway, and in general it should be retransmitted. According to an exemplary embodiment, therefore, devices can opt to keep the byte synchronization switched off most of the time, and thus save power, and only turn it on when it is needed. The link according to exemplary embodiments continues to be robust, as the byte sync is turned on when necessary (e.g., during those periods discussed above). If a byte sync error is detected, this results in triggering as NAC frame, which also turns on byte sync according to exemplary embodiments. Byte sync is thus always regained.

According to one exemplary embodiment, a method for performing byte synchronization on an interconnect can include the steps of: turning on a byte synchronization function during at least one predetermined reception phase and turning off the byte synchronization function after said at least one predetermined reception phase. The predetermined reception phase can, for example, be one, two or all three of link startup, reconfiguration and error recovery. According to an exemplary embodiment, the byte synchronization includes comma code matching.

Figure 6:
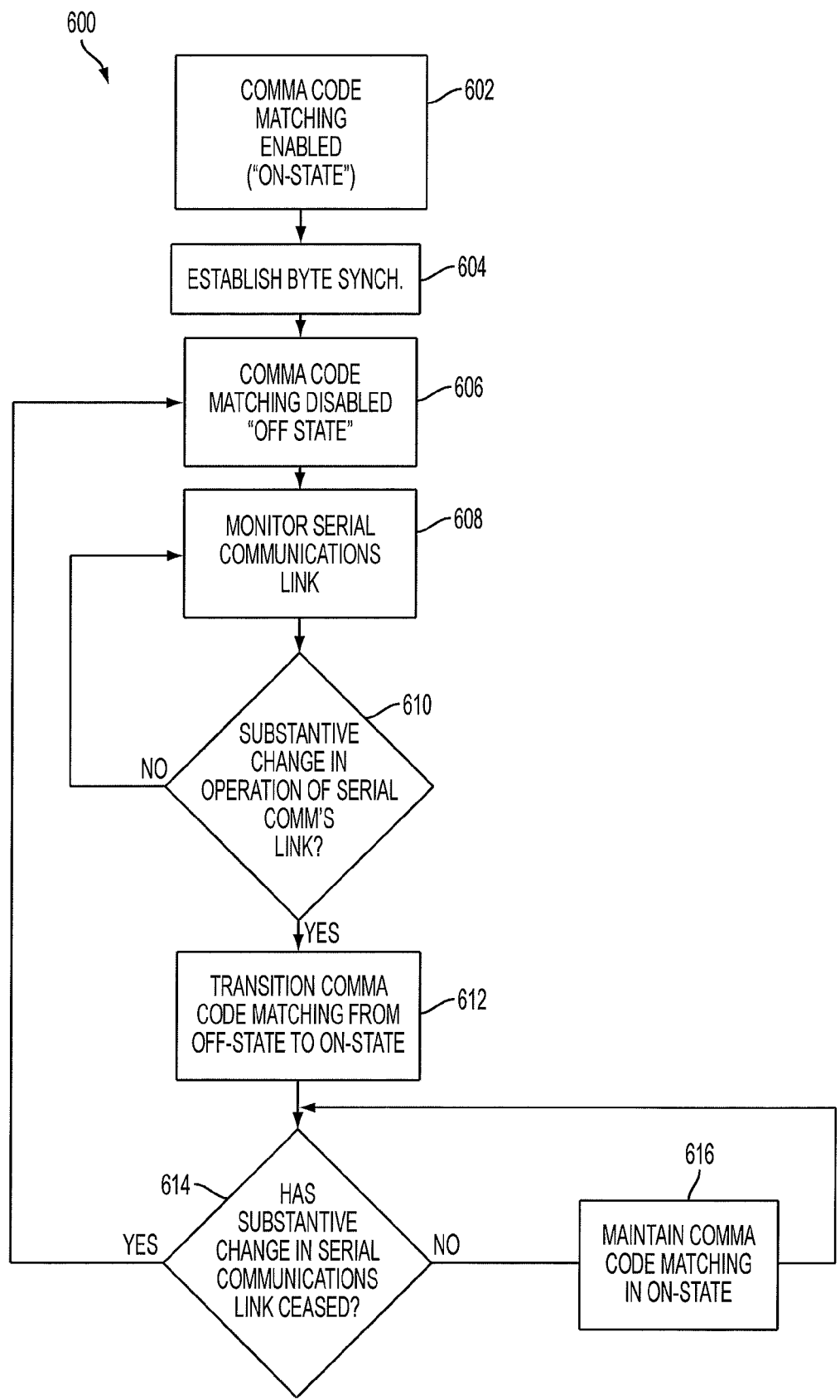
FIG. 6 is a flowchart illustrating a method of minimizing power consumption in a high speed digital serial communications link according to first exemplary embodiment.

FIG. 6 is a flowchart illustrating a method of minimizing power consumption in a high speed digital serial communications link according to first exemplary embodiment. Method 600 shown in FIG. 6 begins with step 602, wherein comma code matching for the serial communications link is enabled, in order to acquire byte synchronization (step S604). In step 606 comma code matching is disabled ("Off" state) according to an exemplary embodiment. According to an exemplary embodiment, power consumption of the devices that utilize the high speed digital serial communications link now decreases because comma code matching consumes a significant amount of power and it is no longer occurring. In step 608, monitoring of the serial communications link occurs, and in decision step 610, a determination is made as to whether a change in operation of the serial communications link, as discussed in greater detail above, has occurred. If a significant change in operation of the serial communications link has not occurred ("No" path from decision step 610), then method 600 transitions back to step 608, and continues to monitor the serial communications link. If, however, there has been a change in operation of the serial communications link ("Yes" path from decision step 610), then method 600 proceeds to step 612. In step 612, method 600 transitions comma code matching from an "Off-state" to an "On-state." While comma code matching is occurring, method 600 proceeds to decision step 614 and determines whether the change in operation of the serial communications link has ceased: if the change in operation of the serial communications link persists ("No" path from decision step 614), comma code matching is maintained in an "On-state" in step 616, and the serial communications link is continuously monitored according to decision step 614. If, however, the change in operation of the serial communications link has ceased to exist ("Yes" path from decision step 614), then method 600 proceeds to step 606 wherein comma code matching is disabled, and again power consumption on average decreases.

Figure 7:
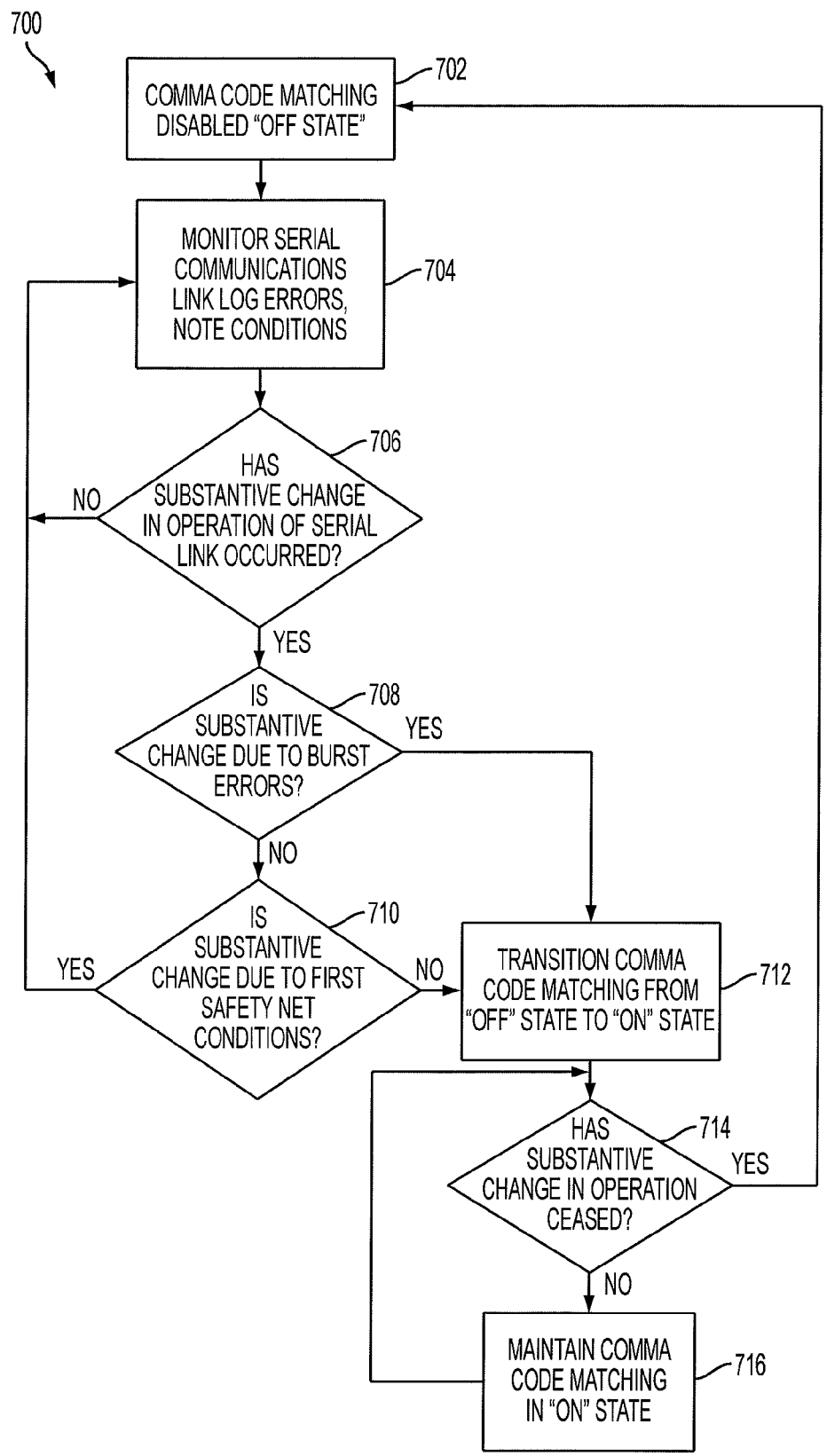
FIG. 7 is a flowchart illustrating a method of minimizing power consumption in a high speed digital serial communications link according to a second exemplary embodiment.

FIG. 7 is a flowchart illustrating a method of minimizing power consumption in a high speed digital serial communications link according to a second exemplary embodiment. Method 700 shown in FIG. 7 begins with step 702, wherein comma code matching for the serial communications link is disabled (i.e., the "Off-state"; as discussed above, initially comma code matching must be enabled in order for a device to initially acquire byte synchronization—however those two steps have been omitted from FIG. 7 for the dual purposes of clarity and brevity). According to an exemplary embodiment, power consumption of the devices that utilize the high speed digital serial communications link now decreases because comma code matching consumes a significant amount of power and it has now been disabled. In step 704, monitoring of the serial communications link occurs. In the monitoring step of 704, data errors are carefully logged. Monitoring is performed in order to determine whether a first or second error condition exists.

In decision step 706, method 700 determines whether a substantive change in operation of the serial communications link exists. If there has been a substantive change in operation of the serial communications link, then method 700 proceeds to step 708 ("Yes" path from decision step 706), and determines what caused the substantive change. In decision step 708, is it determined whether the substantive change in the serial communications link is due to burst errors. If the substantive change is due to the occurrence of burst errors, method 700 transitions the comma code matching from an "Off-state" to an "On-state" in step 712 ("Yes" path from decision step 708). Method 700 continues to monitor the serial communications link for the substantive change in operations in decision step 714, and if the change has ceased ("Yes" path from decision step 714), method 700 transitions to step 702, and disable comma code matching. Otherwise, if the substantive change continues to exist ("No" path from decision step 714), then method 700 maintain comma code matching in step 716, and continues to monitor the serial communications link (decision step 714).

If, however, the substantive change is not due to burst errors ("No" path from decision step 708), then method 700 proceeds to decision step 710, and determines whether the error is due to first safety net conditions, which have been discussed in greater detail above. If the substantive change is due to first safety net conditions ("Yes" path from decision step 710), method 700 transitions to step 704 and continues to monitor the serial communications link. The "Yes" path from decision step 710 corresponds to the situation wherein a first error condition has occurred that does not include burst errors. First error conditions that do not include burst errors are considered allowable. If, however, the substantive change in operation of the serial communications link is not due to first safety conditions ("No" path from decision step 710), then method 700 transitions to step 712, and comma code matching is enabled ("On" state). According to further exemplary embodiments, comma code matching can be enabled when a substantive change in operation of the serial link has occurred that is not a burst error, and not a first safety net, meaning that the substantive change is related to either a second safety net condition (described in detail above "second UniPro safety net"), or, another condition such as power mode changes or link initialization. Then, steps 714 and 716 are repeated, as discussed above, to determine when the error condition ceases, to permit comma code matching to be turned off. Although power consumption of the devices utilizing the high speed serial communications link increases during the periods of comma code matching, such increase is specifically tied to specific conditions in order to minimize the draw of power to perform the comma code matching. According to an exemplary embodiment of the invention, power consumption on average decreases.

According to an exemplary embodiment, implementation of methods 600 and 700 can occur in a dedicated processor (not shown in either of FIG. 4 or 5), or through the various functional blocks shown in FIG. 5 such as NAC de-framer 422, error manager 426, and/or NAC framer 428. Those of ordinary skill in the art in the field of the invention can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the invention, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Turning comma code matching on and off depending on the types of errors, when they occur, and what is happening within the serial communications link, can save power. Reducing power consumption by the serial communications link reduces costs and heat dissipation, and therefore increases the mean time between failure of components, and therefore increase operating efficiency and lifetime of the components.

The present invention can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present invention pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

I claim:

1. A method for minimizing power consumption in a circuit that uses a digital high-speed serial communications link between two digital high-speed serial communications enabled devices, comprising:
    maintaining comma code matching in an off-state for a period of time during which the serial communications link is active and data is received over the active serial communications link; and
    transitioning comma code matching from an off-state to an on-state when an operational change occurs in the serial communications link.

2. The method according to claim 1, wherein the operational change includes at least one of link start-up of communications using the serial communications link, reconfiguration of the serial communications link, and error recovery from an error in the serial communications link.

3. The method according to claim 2, wherein the operational change is a link startup and includes at least one of a boot start-up of at least one of the two devices, and a re-boot condition of at least one of the two devices.

4. The method according to claim 2, wherein the operational change is a reconfiguration and includes reconfiguring the serial communications link in terms of at least one of power and communication speed.

5. The method according to claim 2, further comprising:
    performing byte synchronization in the serial communications link between the two devices.

6. The method according to claim 5, wherein performing byte synchronization includes transmitting a first physical layer marker 0 that is a comma code symbol, followed by a second physical layer symbol marker 1 that can be at least one of a non-comma K-code symbol, a comma K-code symbol, and a data code symbol.

7. The method according to claim 1, wherein the method further comprises:
    transitioning comma code matching from an on-state to an off-state following the reception of a byte synchronization pattern from the serial communications link such that bit and/or byte synchronization is regained.

8. The method according to claim 1, further comprising:
    determining that a burst error has occurred to cause the operational change in the serial communications link, wherein the burst error includes a certain number of PHY symbol transmission errors; and
    transitioning comma code matching from the on-state to the off-state following the reception of a byte synchronization pattern from the serial communications link such that bit and/or byte synchronization is regained.

9. The method according to claim 8, wherein the PHY symbol transmission errors includes at least one of a bad PHY symbol being received, a correct exception PHY symbol being received but not being mapped to a valid UniPro symbol, a correct exception PHY symbol being received immediately after another exception PHY symbol when a data PHY symbol was expected, and an incorrect value of a valid data PHY symbol being received following an ESCape Symbol in the Phy Adapter Layer symbol.

10. The method according to claim 1, further comprising:
    determining that the operational change includes an acknowledgement flow control frame and/or a negative acknowledgment control frame not being received within a duration of a timer.

11. A digital high-speed serial communications transceiver for conducting communications between two digital high speed devices via a serial communications link comprising:
    an error manager configured to capture error indications in received data and control frames, and for issuing a negative acknowledgement control frame request;
    an NAC framer configured to transmit the NAC frame in response to a NAC request, and to initiate the transmission of a byte-sync control signal in response to the received NAC frame;
    at least one receiver, wherein the at least one receiver includes a byte sync sub-block configured to perform comma code matching on received signals from the other device; and
    a byte-sync control sub-block configured to transition the byte sync sub-block between an off-state and an on-state for a period of time, and wherein the byte sync sub-block is further configured to perform comma code matching when a change in operation of the serial communications link occurs.

12. The transceiver according to claim 11, wherein the operational change includes at least one of link start-up of communications using the serial communications link, reconfiguration of the serial communications link, and error recovery from an error in the serial communications link.

13. The transceiver according to claim 12, wherein the operational change is link startup and includes at least one of a boot start-up of at least one of the two devices, and a re-boot condition of at least one of the two devices.

14. The transceiver according to claim 12, wherein the operational change is reconfiguration and includes reconfiguring the serial communications link in terms of at least one of power and communication speed.

15. The transceiver according to claim 12, wherein byte synchronization in the serial communications link occurs between the two devices.

16. The transceiver according to claim 15, wherein byte synchronization includes transmitting a first physical layer symbol marker 0 that is a comma code symbol, followed by a second physical layer symbol marker 1 that can be at least one of a non-comma K-code symbol, a comma K-code symbol, and a data code symbol.

17. The transceiver according to claim 11, wherein the byte-sync control sub-block is configured to transition the byte sync block from an on-state to an off-state following the reception of a byte synchronization pattern from the serial communications link such that bit and/or byte synchronization is regained.

18. The transceiver according to claim 11, wherein
circuitry is configured to determine that a burst error has occurred to cause the change in operation of the serial communications link, wherein the burst error includes a certain number of PHY symbol transmission errors; and wherein
byte sync sub-block is further configured to transition comma code matching from the on-state to the off-state following the reception of a byte synchronization pattern from the serial communications link such that bit and/or byte synchronization is regained.

19. The transceiver according to claim 18, wherein the PHY symbol transmission error includes at least one of a bad PHY symbol being received, a correct exception PHY symbol being received but not being mapped to a valid UniPro symbol, a correct exception PHY symbol being received immediately after another exception PHY symbol when a data PHY symbol was expected, and an incorrect value of a valid data PHY symbol being received following an ESCape Symbol in the Phy Adapter Layer.

20. The transceiver according to claim 11, wherein
the circuitry is further configured to determine that the operational change includes an acknowledgement flow control frame and/or a negative acknowledgement control frame not being received within a duration of a timer.

21. A non-transitory computer readable medium of instructions for minimizing power consumption in a circuit that uses a digital high-speed serial communications link between two devices comprising:
a first set of instructions adapted to maintain comma code matching in an off-state for a period of time during which the serial communications link is active and data is received over the active serial communications link; and
a second set of instruction adapted to transition comma code matching from an off-state to an on-state when an operational change occurs in the serial communications link.

* * * * *